Sept. 24, 1963  O. WEBB, JR  3,105,102
ALKYLATION PROCESS WITH NORMAL PARAFFIN REMOVAL
Filed June 5, 1961  4 Sheets-Sheet 1

INVENTOR.
Orlando Webb, Jr.
BY
ATTORNEY.

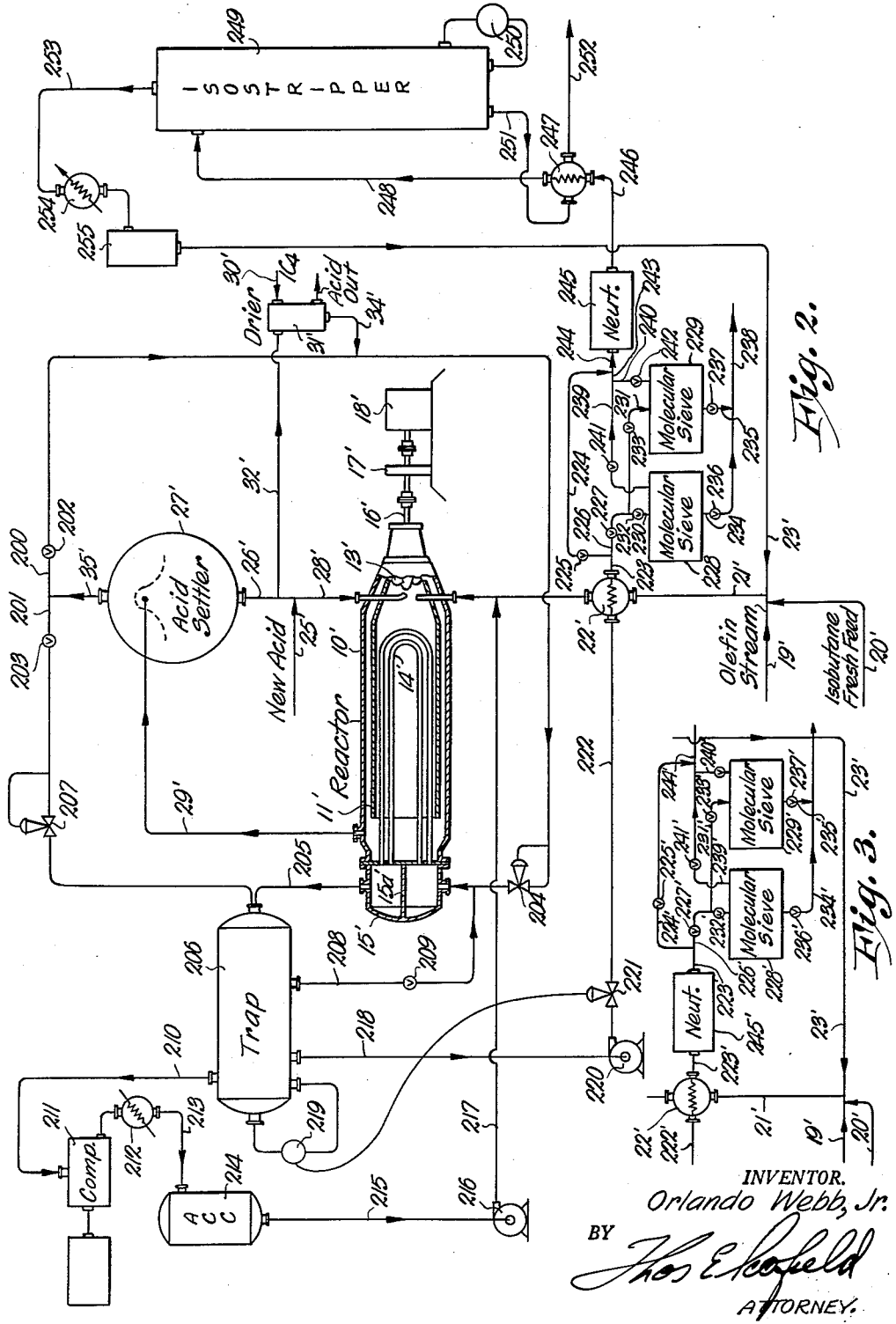

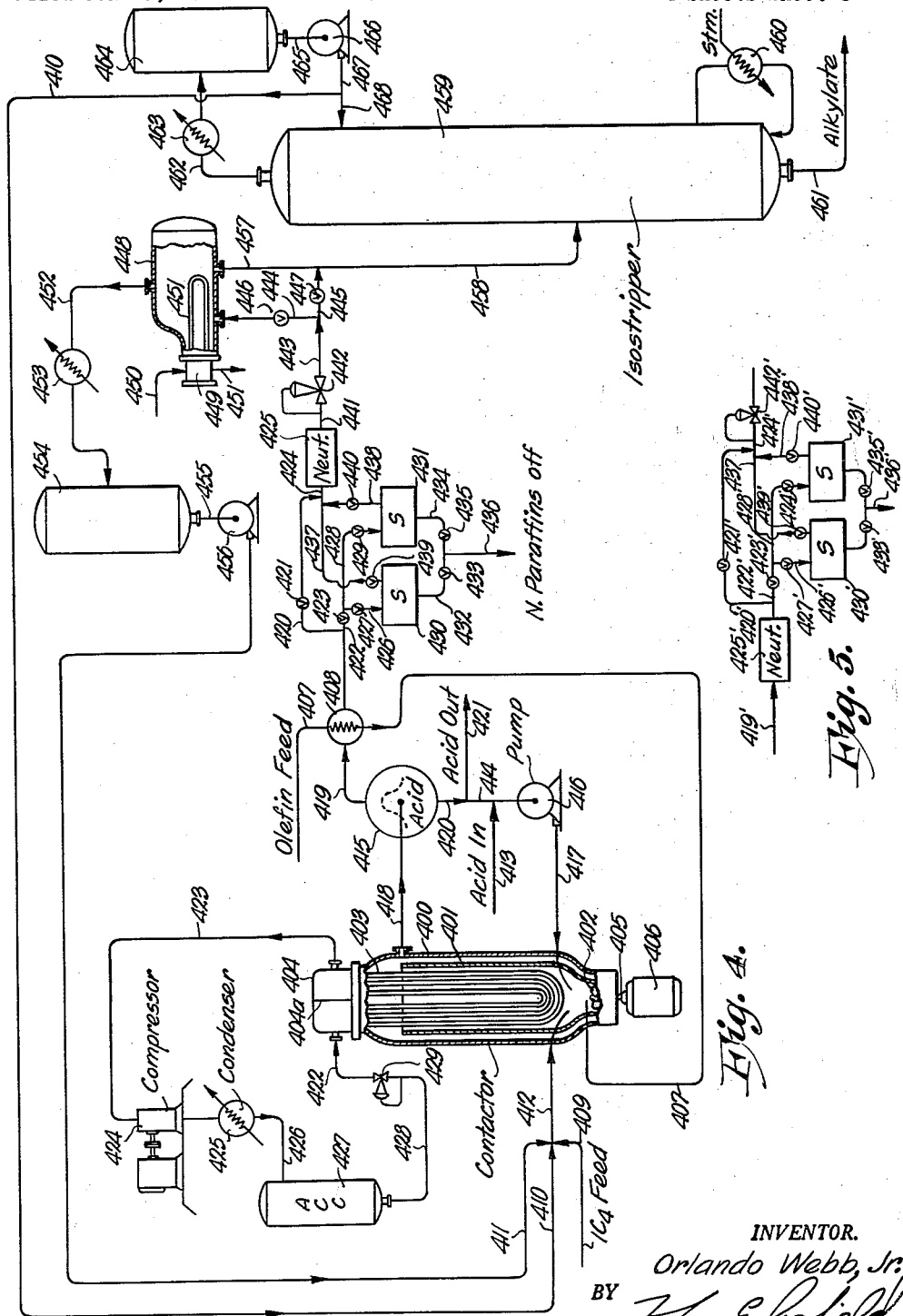

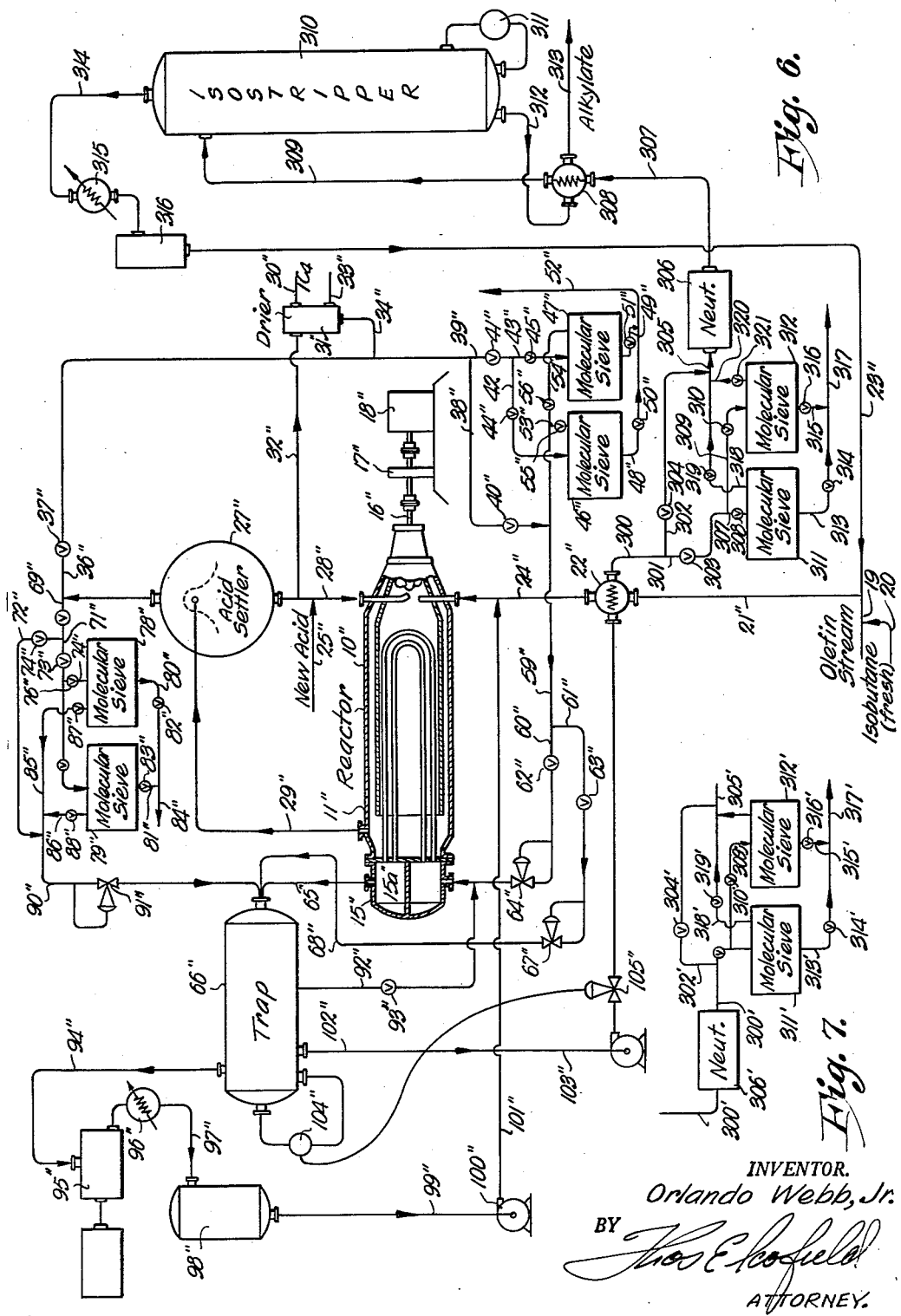

United States Patent Office 3,105,102
Patented Sept. 24, 1963

3,105,102
ALKYLATION PROCESS WITH NORMAL
PARAFFIN REMOVAL
Orlando Webb, Jr., Prairie Village, Kans., assignor to Stratford Engineering Corporation, Kansas City, Mo., a corporation of Delaware
Filed June 5, 1961, Ser. No. 114,999
37 Claims. (Cl. 260—683.58)

This invention relates to alkylation processes employing normal paraffinic hydrocarbon elimination from the system and refers more particularly to such alkylation processes employing molecular sieves for normal paraffinic hydrocarbon elimination.

This application is a continuation-in-part of my application Serial No. 748,833, filed July 16, 198, now U.S. Patent No. 3,055,958, entitled "Alkylation Effluent Flash Vaporization System."

The art is well cognizant of the use of "molecular sieves" for separating various types of hydrocarbons, such as aliphatics from aromatics, straight chain from branched chain, and the like. The following patents typically show the general state of the art in the application of adsorptive sieve beds and the like in separating various types of hydrocarbons, one from the other: Ricards 2,899,474, issued August 11, 1959, "Feed Pre-Treat in Hydrocarbon Adsorption Process"; Patterson et al. 2,901,519, issued August 25, 1959, "Molecular Sieve Separation Process"; Gilmore 2,921,970, issued January 19, 1960, "Process for Separating Normal Aliphatic Hydrocarbons Using Zeolitic Molecular Sieves"; Haensel 2,920,037, issued January 5, 1960, "Separation of Normal Paraffins From Hydrocarbon Mixtures Using Zeolitic Molecular Sieves"; Fleck et al. 2,935,467, issued May 3, 1960, "Fractionation Process Using Zeolitic Molecular Sieves"; Feldbauer, Jr., et al. 2,944,092, issued July 5, 1960, "Gasoline Hydrocarbon Separation Recovery Process Using Zeolitic Molecular Sieves."

The application of molecular sieve separation processes and adsorptive separation processes into alkylation processes wherein isoparaffinic hydrocarbons are alkylated with olefinic hydrocarbons in the presence of acid catalysts is also known to the art. Thus, Stiles 2,920,125, issued January 5, 1960, "Regeneration of Adsorbent Materials Used in Treating an Alkylate" discloses separation of the produced alkylate and acidic contaminants thereof. Smith 2,935,543, issued May 3, 1960, "Alkylation Process" discloses the isomerization of a straight chain hydrocarbon feed into an isomeric mixture comprising the straight chain hydrocarbon and a corresponding isomeric branched chain hydrocarbon with the isomate subjected to contact with the molecular sieve thereby preferentially adsorbing straight chain hydrocarbons to the exclusion of the nonstraight chain hydrocarbons. The branched chain hydrocarbons are then introduced into the alkylation zone with olefins and catalyst in a conventional reaction step. W. L. Vermilion, Jr., 2,946,832, issued July 26, 1960, "Alkylation Process" discloses, in an alkylation process, the passage of the hydrocarbon phase effluent after removal of residual acids to a deisobutanizer, the overhead from the deisobutanizer being passed to a molecular sieve bed to separate normal butane from isobutane, the latter being recycled to the reaction step.

An object of the instant invention is to provide means and steps for strategically removing normal paraffinic hydrocarbons from an alkylation system reaction effluent whereby to more greatly enhance the desirable characteristics of the reaction step and other parameters of the alkylation system than previously achieved.

Another object of the invention is to provide ways for removing normal paraffinic hydrocarbons from an alkylation system reaction effluent to achieve the said results employing molecular sieve adsorption beds.

Yet another object of the invention is to permit the replacement, in an alkylation process employing normal paraffin removal therefrom, of the conventional deisobutanizer fractionation column with very much simplified and lower cost isostripper column, requiring no reflux therefrom and yet producing a very high purity recycle.

Another object of the invention is to provide an alkylation process employing normal paraffinic hydrocarbon elimination wherein recycle feeds to the reaction step are provided which are abnormally high in isobutane content whereby to make them far more effective in building up the isobutane concentration in the alkylation reaction.

Another object of the invention is to provide an alkylation process employing both effluent refrigeration and normal paraffin elimination wherein flashed vapors from the effluent refrigeration suction trap and light hydrocarbon recycle from the isostripper are abnormally high in isobutane content, whereby to make them far more effective in building up the isobutane concentration in the reaction step.

Another object of the invention is to provide an alkylation process utilizing effluent flash vaporization separation of light hydrocarbons from the hydrocarbon phase effluent and, additionally, normal paraffinic hydrocarbon elimination wherein recycled vapors from the alkylation flash vaporization step and also from the isostripper stage are abnormally high in isobutane content, whereby to make them far more effective in building up the isobutane concentration in the alkylation reactor.

Another object of the invention is to provide an alkylation process with normal paraffinic hydrocarbon removal from the system wherein it is possible to produce alkylate of extremely high quality with improved boiling range characteristics and with a minimum and unusually low acid consumption.

Another object of the invention is to provide an alkylation process employing normal paraffinic hydrocarbon removal from the system wherein the efficiency of the entire alkylation unit and process is considerably greater than conventional processes due to the reduction of normal paraffin hydrocarbon diluent in the system at critical process stages in the system.

Yet another object of the invention is to provide a variety of ways of normal paraffinic hydrocarbon elimination from alkylation systems whereby to achieve the many advantages thereof independent of the type of refrigeration system used (closed cycle or effluent refrigeration) and independent of the system used in the alkylation process for separation and recycle of isobutane from the reaction effluent (effluent refrigeration separation, alkylation flash vaporization, fractionation separation, etc.)

Yet another object of the invention is to provide a variety of ways of normal paraffinic hydrocarbon elimination from alkylation processes and systems employing molecular sieves, whereby to achieve maximum and complete normal paraffinic hydrocarbon separation, permit a maximum throughput flow in the alkylation system, provide ample time periods for sieve clearance and desorption, and also provide a multiplicity of flow alternatives for permitting sieve replacement or repair without shutting down the system.

Other and further objects of the invention will appear in the course of the following description thereof.

In the drawings, which form a part of the instant specification and are to be read in conjunction therewith, embodiments of the invention are shown.

FIG. 2 is a schematic flow diagram of an alkylation unit employing effluent refrigeration to cool the reaction step and illustrating a second manner of employing molecular sieves in said system for elimination of normal paraffinic hydrocarbons therefrom.

FIG. 3 is a fragmentary view of a portion of the unit of FIG. 2 showing a variation in position of the neutralization step therein.

FIG. 4 is a schematic flow diagram of an alkylation unit employing a closed cycle refrigeration system for the reaction step and an optional alkylation flash vaporization system for separation of isoparaffinic hydrocarbons from the reaction effluent for recycle to the reaction step, a molecular sieve system applied in the unit to provide elimination of normal paraffinic hydrocarbons therefrom.

FIG. 5 is a fragmentary view of a variation of the unit of FIG. 4 showing relocation of the neutralization step therein.

FIG. 6 is a schematic flow diagram of an alkylation unit employing various types of effluent refrigeration to cool the reaction step and separate volatile hydrocarbons from the hydrocarbon phase effluent, application of molecular sieve separation beds being made into the system at various points to separate normal paraffinic hydrocarbon diluents from the reaction effluent.

FIG. 7 is a fragmentary view of a portion of the alkylation unit of FIG. 6 showing relocation of the neutralization step therein.

Figure 1:
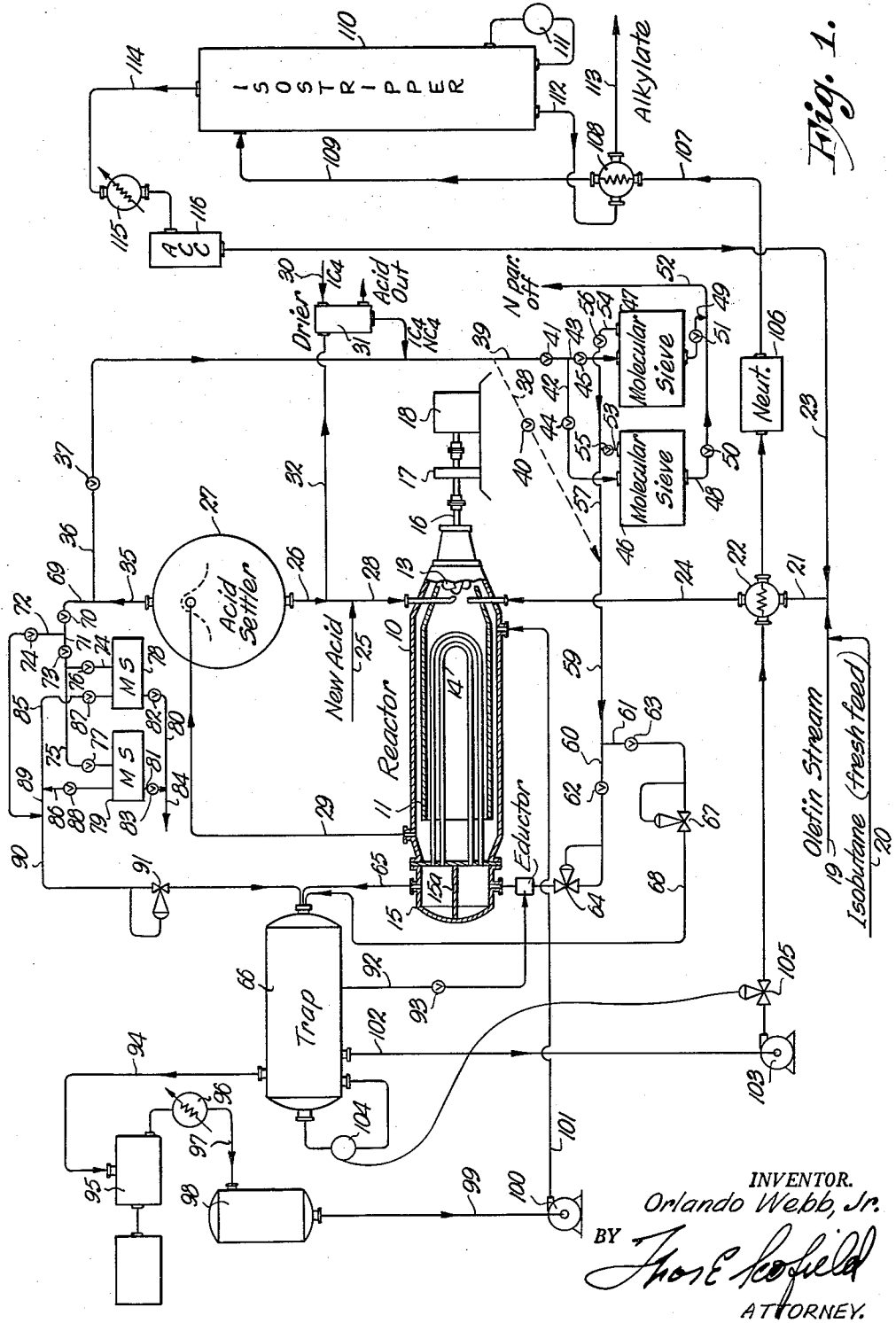
FIG. 1 is a schematic flow diagram of an alkylation unit employing various types of effluent refrigeration of the reaction step and also showing application of molecular sieves for normal paraffinic hydrocarbon elimination from the system.

*FIG. 1—Normal Paraffinic Hydrocarbon Separation in Effluent Refrigeration*

Referring particularly to FIG. 1, at 10 is shown the shell of a reactor equipped with an open-ended circulating tube 11. At one end of the circulating tube is an impeller 13 which serves the purpose of a circulating pump in cooperation with the circulating tube. Within the circulating tube 11 are a plurality of heat exchanger elements 14 comprising a tube bundle provided with a distributing head 15 enclosing one end of the reactor. The impeller 13 is mounted on a shaft 16 rotated through a reduction gear 17 by any suitable source of power or prime mover such as an electrical motor or steam turbine diagrammatically shown at 18.

Circulation within the reactor is established by the impeller through the annular space between the shell 10 and circulating tube 11 around the cooling or heat exchange tubes 14 and back to the impeller. Olefinic hydrocarbons and isobutane in excess are introduced to the system through lines 19 and 20, respectively, and are combined in feed pipe 21 prior to passage through heat exchanger 22. Recycled isobutane from fractionation is returned through line 23 and introduced into the hydrocarbon mixture before the latter reaches heat exchanger 22, constituting a portion of the feed supplied to the reactor through line 24.

Fresh acid is supplied to the system through line 25 being combined with recycle acid bottoms through line 26 from acid settler 27. The mixed acid is passed to the reactor through line 28.

Hydrocarbons supplied through lines 19 and 20 combined with recycled isobutane are mixed in the reactor with the acid catalyst introduced through line 28. Akylation of the isoparaffinic hydrocarbons by the olefinic hydrocarbons takes place in the reactor while the mixture is being rapidly circulated and agitated by impeller 13 which assures mixing of the hydrocarbons in acid catalyst.

The effluent mixture of hydrocarbons and acids is discharged from the reactor through line 29, passing first to the acid settler 27 where it is permitted to separate into a hydrocarbon phase and an acid phase. The acid phase is withdrawn from the bottom of the settler and returned to the reactor through lines 26 and 28. As a separate additional source of isobutane alternatively or concurrently usable with feed line 20, particularly with isobutane of low purity (below 80%), line 30 passes field isobutane makeup into dryer 31, which comprises simply a drum with concurrent flow of spent alkylation acid from line 32 and makeup isobutane, which for this flow diagram may be assumed to be of low isobutane purity. With the acid dryer, moisture will be removed from the makeup isobutane stream before being introduced to the sieve system to be described and corrosion will be avoided. Acid is taken from the dryer by line 33 and the dried isobutane makeup stream goes into the system through line 34.

The hydrocarbon phase separated in settler 27 is discharged from the top through line 35. From the top of the acid settler, in an effluent refrigeration system, a number of alternatives are possible. Typical effluent refrigeration and evaporative cooling systems for alkylation processes are shown in the patents to David H. Putney Nos. 2,664,452, issued December 29, 1953, "Process for Alkylation Utilizing Evaporative Cooling" and 2,949,494, issued August 16, 1960, "Alkylation of Hydrocarbons Utilizing Evaporative Cooling."

In a first modification of the invention applied in an effluent refrigeration system, the hydrocarbon phase effluent, wholly or in part, is passed into line 36, controlled by valve 37. This hydrocarbon phase effluent picks up the isobutane makeup stream from line 34 and then may be passed wholly or in part into either or both of lines 38 and 39, controlled by valves 40 and 41, respectively. In the event that all of the hydrocarbon phase effluent passing through line 36 is passed through line 38, no normal paraffinic separation is made from this effluent before reaching the suction trap of the effluent refrigeration system. On the other hand, if all or any of the hydrocarbon phase effluent in line 36 is passed through line 39, controlled by valve 41, normal paraffinic separation may be made therefrom as will be described.

Lines 42 and 43 controlled by valves 44 and 45, respectively, pass to molecular sieves 46 and 47. The sieves are such as separate normal paraffinic hydrocarbons in the chain length of the system from isoparaffinic hydrocarbons. The sieve showing in this and the other figures are purely schematic. Normal paraffinic hydrocarbons are removed from sieves 46 and 47 through lines 48 and 49 controlled by valves 50 and 51, respectively, the lines joining in output line 52. Isoparaffinic hydrocarbons are removed from the sieve through lines 53 and 54, controlled by valves 55 and 56, respectively, these lines joining in line 57 which meets bypass line 38, resulting in common line 59. From line 59, the hydrocarbon phase effluent, normal paraffin extracted to a greater or lesser degree, may be passed into either line 60 or line 61, controlled by valves 62 and 63, respectively. It should be noted that the molecular sieve system operates preferably with one sieve on stream until it is fully loaded and ready for desorption, with the other sieve then being put in the stream and so on. The hydrocarbon phase effluent passed into line 60 is pressure reduced at valve 64 and from thence passed at greatly increased velocity into the distributing head which is divided by baffle 15a whereby the hydrocarbon phase effluent, both liquid and vapor, passes through the tube bundle, cooling the reaction step and vaporizing excess light hydrocarbons in the effluent and out the other side of the distributor through line 65 to suction trap 66. Alternatively, or simultaneously, the hydrocarbon phase effluent may be passed to greater or lesser degree through line 61, pressure reduced at valve 67 and thence passed through line 68 to the suction trap.

Returning to the acid settler and the line 35 taking the hydrocarbon phase from the upper portion thereof, alternatively, the hydrocarbon phase effluent may be passed entirely or to a greater or lesser degree into line 69, controlled by valve 70. From valve 70, the hydrocarbon phase effluent may be passed into either or both lines 71 and 72, controlled by valves 73 and 74, respectively. In the event the hydrocarbon phase effluent is passed in at least some part into line 71 through valve 73, it is passed through lines 74 or 75 controlled by valves 76 and 77, respectively, to molecular sieves 78 or 79. Normal paraffinic hydrocarbons are removed from said sieves by lines 80 and 81, controlled by valves 82 and 83, respectively, the normal paraffinic hydrocarbons carried off through common line 84. Branched chain hydrocarbons are returned from the sieves through lines 85 and 86, controlled by valves 87 and 88, respectively, passing into common line 89. The latter is joined by line 72 after the outputs for the branched chain hydrocarbons from the sieves. Again, this sieve system is run in conventional fashion in the sense that one sieve is employed until it is completely loaded with adsorbed material, then it is taken out of stream by valve control and the other sieve put into stream while the first is desorbed. In any sieve system referred to in this application, more than two sieves may be employed as required to keep the system continuously on stream.

Line 72 serves as a bypass option in the event that it is desired to pass the hydrocarbon phase effluent from acid settler 27 through line 69 to greater or lesser degree, but also to use the sieve system to greater or lesser degree, optionally providing complete bypass occasionally when the sieves 46 and 47 may be those only employed. From line 89 or line 72, the hydrocarbon phase effluent, with greater or lesser normal paraffinic elimination therefrom is passed into common line 90, pressure reduced at back pressure valve 91 and passed to suction trap 66. Back pressure valves 91, 64 and 67 maintain sufficient back pressure in the system to keep the hydrocarbons in liquid phase throughout the sieve extraction, if such is desired. The back pressure valves may be so positioned on lines 69, 71, 72, 36, 39 and 38 as to reduce pressure before the sieve systems, if desired.

In the event that the hydrocarbon phase effluent came to trap 66 through line 90 or through line 68 to any measurable extent, it will probably be desirable to recycle liquid bottoms through line 92, controlled by valve 93 into line 60 after valve 64 in order to get greater heat exchange in the reaction step whereby to cool the reaction step and vaporize excess volatile hydrocarbons from the liquid bottoms of the trap. Even where all of the hydrocarbon phase effluent is passed through line 60, this may be desirable to achieve the greatest heat exchanging effect.

It should be observed that, with the sieve systems shown, all of the hydrocarbon phase effluent can be normal paraffin stripped by passing through lines 69 and 71 or, alternatively, all can be normal paraffin extracted by passing through lines 36 and 39. Bypass at either lines 72 or 38 leaves some hydrocarbon phase effluent not normal paraffin stripped. Yet alternatively, the hydrocarbon phase effluent can be split between lines 36 and 39 and lines 69 and 71, respectively, and still be entirely normal paraffin stripped. This gives a great deal of versatility and freedom in handling the sieve systems and also permits a larger volume flow-through in the entire system when both are used than through either system alone.

From trap 66, light hydrocarbon vapors are passed off overhead through line 94 for compression and condensation at 95 and 96 and passage through line 97 to accumulator 98. These vapors will be abnormally high in isobutane if the normal paraffinic hydrocarbons have been largely stripped in one or both of the two sieve systems in lines 36 and 69. From accumulator 98, the condensed cooled light hydrocarbons, rich in isobutane, are recycled through line 99 by pump 100 and line 101 to join input feed line 24 as a recycle feed constituent.

From the bottom of trap 66, line 102 passes liquid bottoms driven by pump 103 in volume controlled by level control 104 and valve 105 through the heat exchanger step at 22 to a neutralization stage at 106. It should be particularly noted that, in the case of the sieve systems shown, if the catalyst acid will damage the sieves, the neutralization step may be placed before the sieves (between the settler and the sieves) rather than after. From thence through line 107, the neutralized heavier hydrocarbons, carrying some isoparaffinic hydrocarbons as diluent, are passed through a heat exchanging step at 108 through line 109 to isostripper 110. Isostripper 110 may substitute for a large scale deisobutanizer at this point due to the previous removal of the greater portion of the normal paraffinic hydrocarbons in one of the sieve systems whereby the bottoms from the trap are also abnormally rich in isobutane and abnormally poor in normal paraffinic hydrocarbons. Alternatively, and in all instances where isostrippers are employed in this disclosure, a refluxing deisobutanizer may be employed. The bottoms from the isostripper are reboiled at 111, while the alkylate is taken off therefrom through line 112, heat exchanging the feed to the isostripper at 108 and out through line 113. The overhead from the isostripper, very rich in isobutane and poor in diluent normal paraffinic hydrocarbons is passed through line 114 to a condensing step at 115 and thence to accumulator 116. From accumulator 116, the liquefied isoparaffinic hydrocarbons are passed through line 23 to join lines 19 and 20 as a recycle feed constituent to the reaction step.

It should be noted that it is critical in the effluent refrigeration system, however it is employed, to extract the normal paraffinic hydrocarbons from the hydrocarbon phase effluent from the acid settler before they reach the suction trap, as, from that stage, they are taken off as bottoms or overhead mixed with the recycle feed constituents. In order to clear the isobutane recycle feed constituents from the overhead from the suction trap, the paraffinic separation must come before the recycle and, in order to clear the feed to the isostripper and avoid the necessity of an expensive deisobutanizer, again, the hydrocarbon phase effluent must be stripped preferably before the separation at the trap and at any rate before passage to the isostripping stage.

*FIG. 2—Normal Paraffinic Hydrocarbon Separation In Effluent Refrigeration (Modification)*

Referring to FIG. 2, the alkylation reactor, its internal structure and function, and the feed lines thereto and withdrawal lines therefrom are identical to those those of FIG. 1 up to and including numeral 35. Thus, the description of FIG. 1 up to and including the description of line 35 from the top of the acid settler is herewith incorporated and the same numbers will be applied to FIG. 2, except primed.

The hydrocarbon phase effluent from the top of acid settler 27' is taken off through line 35' and passed alternatively or simultaneously through lines 200 and 201, controlled by valves 202 and 203, respectively. In the event that the hydrocarbon phase effluent is passed in whole or in part through line 200, it may pick up dried isobutane feed from line 34', and then is passed to a pressure reduction step at valve 204 and from thence into one side of header 15', through the heat exchange coils 14', out the other side of the header and through line 205 to suction trap 206. Thus the portion of the hydrocarbon phase effluent passing through line 200 heat exchanges the reaction step and has excess light paraffinic and isoparaffinic hydrocarbons vaporized therefrom by the heat of the reaction step.

On the other hand, the portion of the hydrocarbon phase effluent which may be passed through line 201 is pressure reduced at back pressure valve 207 and passed also to suction trap 206. To the extent that the hydrocarbon phase effluent is passed through line 201 or, in order to achieve additional heat exchanging benefits in the reaction step, liquid bottoms from suction trap 206 may be recycled through line 208 controlled by valve 209 into line 200 just before the header 15'. An eduction step may be employed at this juncture, as in the same juncture in FIG. 1, if desired.

The resultant process in suction trap 206 is to vaporize light isoparaffinic and paraffinic hydrocarbons, taken off the top through line 210, compressed and condensed at 211 and 212, then passed through line 213 to accumulator 214. Bottoms from the accumulator are then recycled through line 215, pump 216 and line 217 joining feed line 21 as a recycle feed constituent.

It should be carefully noted that there has been no reduction in the normal paraffinic hydrocarbon diluents relative to the reaction step at this point, thus the light isoparaffinic hydrocarbons recycle from the top of the suction trap 206 back into the reaction step is without reduction of the normal paraffinic diluent therein.

Liquid bottoms from the suction trap are taken off through line 218, controlled by level control 219, driven by pump 220 through control valve 221. From valve 221, line 222 passes the suction trap bottoms, including alkylate, diluent normal paraffinic hydrocarbons, diluent isoparaffinic hydrocarbons, etc. to a heat exchanging step at 22'. From the heat exchanging step at 22', line 223 may be passed optionally through line 224 controlled by valve 225 or into line 226 controlled by valve 227. The latter line passes to the molecular sieves 228 and 229 through lines 230 and 231, controlled by valves 232 and 233, respectively. Bypass line 224 may be employed to entirely bypass the molecular sieve section in case the sieves are down entirely for some reason or may bypass a percentage flow from line 223 to lighten the load on the sieve system. On the other hand, the entire charge from line 223 may be passed alternatively into the sieves 228 and 229, controlled by the valves 232 and 233.

Normal paraffinic hydrocarbons are removed from the molecular sieves through lines 234 and 235 controlled by valves 236 and 237, respectively, lines 234 and 235 feeding into common withdrawal line 238. The branched chain hydrocarbons, including alkylate and diluent isoparaffinic hydrocarbons are taken off the sieves by lines 239 and 240, controlled by valves 241 and 242. Common line 243 joins 224 in a common line 244 and passes to a neutralization step diagrammatically indicated at 245. The neutralization step may be placed before the sieves if the catalyst will damage same (FIG. 3). The neutralized isoparaffinic diluent hydrocarbons and alkylate then pass through line 246 to a heat exchanging step 247 and thence through line 248 to isostripper 249. The isostripper has a reboiler 250, with alkylate bottoms therefrom taken off through line 251, passing through the heat exchanging step with the feed to the isostripper at 247 and then out of the system through line 252. Overhead from the isostripper is taken off through line 253, comprising largely isoparaffinic hydrocarbons, is condensed at 254 and accumulated at 255. The return line 23' passes the recycle isoparaffinic hydrocarbons, freed from normal paraffinic diluent to a greater or lesser degree, back to the common feed line 21'.

Comparing the system of FIG. 2 to that of FIG. 1, the fresh feeds of isobutane are noted at 20' and 30' in FIG. 2 and 20 and 30 in FIG. 1. In FIG. 1, normal paraffinic diluents may be entirely or to a greater or lesser degree removed from the hydrocarbon phase effluent before reaching the suction trap. Thus the recycle from the suction trap overhead through line 101 in FIG. 1 is very rich in isobutane content and substantially possibly normal paraffinic hydrocarbon diluent free. Additionally, the bottoms from the suction trap passed over through lines 102 and 107 to the isotripper are substantially possibly normal paraffinic hydrocarbon diluent free so that the isoparaffinic hydrocarbon recycle from the isostripper overhead through line 114 and 23 is also abnormally rich in isobutane. Thus FIG. 1 provides normal parafinic elimination, as desired, from all recycle feed streams to the reaction vessel. On the other hand, FIG. 2, not removing normal paraffinic hydrocarbon diluent until after the suction trap stage, fails to control the normal paraffinic content in the suction trap overhead recycle and only removes normal paraffinic diluents from the bottoms from the suction trap. However, and this is a critical economic point, nevertheless, the molecular sieve arrangement of FIG. 2 does unload the alkylate-isoparaffinic separation step designated as an isostripper step at 249 in FIG. 2, thus making a great saving possible in this piece of equipment. Additionally, the isobutane ratio in the reactor is more favorable by a substantial margin than it would be without the normal paraffinic diluent removal shown in FIG. 2.

FIG. 3 shows a variation of the system of FIG. 2 where the neutralization step is emplaced before the sieve system. All of the parts remain the same except their relative position is moved. Therefore, all of the parts are numbered the same, but primed.

The molecular sieve system of FIGS. 2 and 3 is operated in the same manner as those described in FIG. 1, namely, one sieve is employed at a time until it is completely adsorbed, then it is taken off stream with the other sieve taking the load while the first one is desorbed. The action then moves back and forth between the sieves or between members of such series of sieves as may be set up to handle the particular flow desired.

*FIGS. 6 and 7—Normal Paraffinic Hydrocarbon Removal From Effluent Refrigeration System Both Before and After Suction Trap*

The systems of FIGS. 6 and 7, constituting an extension of the systems of FIGS. 1, 2 and 3, will now be described. As the operating system and arrangement of parts and hookup is identical to that of FIG. 1 until passing through the control valve 105 of the bottoms from the suction trap passing to fractionation, neutralization and the like, the description of parts in operation of FIG. 1 is incorporated in its entirety without duplication here and the parts will be numbered the same, but double primed, to distinguished both from FIG. 1 and FIG. 2.

To briefly recapitulate the operation of the FIG. 6 system up to the control valve 105", the reaction step and reactor involved are cooled by effluent refrigeration, in that, the hydrocarbon phase effluent from acid settler 27" is passed through line 35" and then split between lines 69' and 36" or alternatively sent through either of them solely. That portion of the hydrocarbon phase effluent passing through line 36" picks up new isobutane from line 34' and may be normal paraffn extracted to a greater or lesser degree in the sieve system 46' and 47'. A neutralization step (not shown) may be inserted before the sieve, if desired. From thence it may be passed directly, after pressure reduction to the trap through line 68" or pressure reduced at valve 64" and thence passed through the reaction vessel in heat exchange therewith to the trap 66'. That portion of the hydrocarbon phase effluent passed through line 69" may be normal paraffin eliminated in the sieve system 79" and 78" or bypassed therearound through line 72", the effluent then being pressure reduced at back pressure valve 91" and thence passed into the suction trap 66". Again, a neutralization step may precede passage to the sieve.

The vapor overhead from the suction trap through line 94" thus may be entirely or to a greater or lesser degree normal paraffin eliminated so that the light hydrocarbon recycle feed to line 24" through line 101" is abnormally high in isobutane content. Secondly, the liquid bottoms from the suction trap taken off through line 102" may be entirely or to a greater or lesser degree normal paraffinic hydrocarbon eliminated so that the material passed out of the suction trap 66" through line 102" is abnormally high in isobutane content whereby any light hydrocarbon later separated from the alkylate product and recycled to the reaction step would substantially raise the isobutane ratio in the reaction step. Additionally, such n-paraffin removal would serve to reduce the load on the fractionation vessel, permitting the change of this type of vessel from an expensive large size deisobutanizer to a vessel characterized essentially as an isostripper.

However, and this is the point of the arrangement of FIG. 6, in addition to providing the options in effluent refrigeration to balance the heat and temperature levels in the reaction step as desired through varying the effluent refrigeration system, and in addition to the desirability of having the versatility of two sieve systems which permit larger capacity, more constant operation time, less hazard of down time, more freedom of access to the sieves for replacement and repair, etc., additionally, it is desirable to have yet a further parameter of freedom, versatility and completeness of normal paraffinic hydrocarbon removal in the system. This freedom, etc. is achieved by the combination of the molecular sieve system of FIG. 2, namely, that on the line carrying the suction trap bottoms to the fractionation step, with the effluent refrigeration sieve systems of FIG. 1.

Referring then to FIG. 6, the suction trap bottoms, normal paraffin eliminated to a greater or lesser degree by means of the sieve systems on the hydrocarbon phase effluent lines from the acid settler 27" to the suction trap 66", are removed from the bottom of the trap through line 102", driven by pump 103" and passed to a heat exchanging step with the input feed of olefins and isobutane at 22". From the heat exchanging step, through line 300, the suction trap bottoms may be passed alternatively into lines 301 or 302 controlled by valves 303 and 304, respectively. In the event that a portion or all of the suction trap bottoms are passed through line 302, they go into common line 305 and from thence to neutralization step 306. On the other hand, that portion of the suction trap bottoms passed into line 301 are passed into the molecular sieve system, either line 307 controlled by valve 308 or line 309, controlled by valve 310. Sieves 311 and 312 have output lines 313 controlled by valve 314 and 315 controlled by valve 316, respectively, meeting common normal paraffinic elimination line 317 taking the normal paraffins out of the system. From the sieve, the alkylate and diluent isoparaffins from the suction trap bottoms are removed by line 318 controlled by valve 319 and line 320 controlled by valve 321 for sieves 311 and 312, respectively. Once again, the alkylate and isoparaffinic hydrocarbons from the sieves are passed into common line 305 to a neutralization step designated schematically at 306. From the neutralization step the neutralized hydrocarbons are passed through line 307 to a heat exchanging step with the bottoms from the isostripper at 308 and from thence through line 309 to isostripper 310.

Bottoms in the isostripper are reboiled as at 311, while the alkylate product is taken off through line 312, heat exchanges the feed to the isostripper at 308 and passed out of the system through line 313. The overhead from the isostripper is taken off through line 314, condensed at 315 and accumulated at 316 with the isoparaffinic hydrocarbon overhead, normal paraffin eliminated to greater or lesser degree, returned to the system as a recycle feed constituent through line 23".

Thus it is seen that the greatest versatility with the normal paraffin hydrocarbon elimination and the greatest completeness of such is achievable in the system of FIG. 6. If desired, all or the greatest portion of the normal paraffinic hydrocarbons can be removed in the sieve systems for the suction trap, or either of them, thus completely freeing the sieve system on the suction trap bottom lines from load. Alternatively, only one of the sieve systems in the effluent system may be used to extract all or a lesser portion of the normal paraffinic hydrocarbon diluent before the trap. Yet alternatively, neither of the effluent systems may be used and only the sieve system on the suction trap bottom line employed, yet achieve major advantages by way of enriching the isobutane concentration in the reactor and reducing the load on the fractionation step separating the alkylate from the light hydrocarbon overhead. The use of the sieve systems in the effluent refrigeration system has an additional advantage in that it minimizes the load on the entire suction trap system, including the suction trap itself, and the means for condensing and recycling the vapor overhead therefrom and passing the vapor overhead therefrom and passing the liquid bottoms therefrom. Yet on the other hand, it may be desirable to employ the normal paraffinic hydrocarbon diluent to a greater or lesser degree in the effluent refrigeration system as a vaporizable component, depending upon the refrigeration characteristics of the reactor. In such case it may be desirable to employ the sieve system in the suction trap bottom removal to a greater degree whereby the normal paraffinic hydrocarbon diluents fed in through line 30" and 20 will have at least some heat exchanging effect in the reaction step before removal from the system.

Referring to FIG. 7, therein is shown a variation of the FIG. 6 hook-up wherein the neutralization step is replaced before the molecular sieve system on line 300. All the parts are numbered the same as in FIG. 6, but primed.

*FIGS. 4 and 5—Normal Paraffinic Hydrocarbon Elimination from Alkylation Process Utilizing Alkylation Flash Vaporization System*

Referring to FIGS. 4 and 5, at 400 is shown the shell of a reactor equipped with an open-ended circulating tube 401. At one end of the circulating tube is an impeller 402 which serves the purpose of a circulating pump in cooperation with the circulating tube. Within the circulating tube 401 are a plurality of heat exchanger elements 403 comprising a tube bundle provided with a distributing head 404 enclosing one end of the reactor. The impeller 402 is mounted on a shaft 405 rotated by any suitable source of power or prime mover shown at 406. The circulation in vessel 400 is the same as in the previously-described reactors in the other figures and thus will not be redescribed. A reactor or contactor such as that shown in the application of David H. Putney, Serial No. 669,530, now Patent No. 2,979,308, issued April 11, 1961, "Apparatus for Controlling Temperature Change of Blends of Fluids or Fluids and Finely Divided Solids" is suitable for use in the hookup of FIG. 4, as well as the other hookups of the other figures.

Olefinic hydrocarbons are fed in through line 407, heat exchanged at 408 and passed into the reactor before the impeller through the shell and circulating tube. Isobutane feed or a field stream containing isobutane is fed in through line 409, joining isobutane recycle lines 410 and 411 from the isostripper and effluent flash systems to be described, passing in common line 412 into the reactor before the impeller. Olefinic feed line 407 and line 412 may be joined before the reactor, if desired. New acid is input through line 413 joining recycle acid line 414 from acid settler 415, the combined streams passed by pump 416 through line 417 into the reactor before the impeller.

The hydrocarbons supplied through lines 407 and 412 are mixed in the reactor with the acid catalyst introduced through line 417. Alkylation of the isoparaffinic hydrocarbons by the olefinic hydrocarbons takes place in the reactor while the mixture is being rapidly circulated and agitated by impeller 402, which assures mixing of the hydrocarbons in the acid catalyst.

The effluent mixture of hydrocarbons and acids is discharged from the reactor through line 418, passing first to the acid settler 415 where it is permitted to separate into a hydrocarbon phase and an acid phase. The reaction effluent hydrocarbon phase is taken off the top of the acid separator and settler through line 419. Acid bottoms are taken off the settler through line 420 with depleted acid taken out of the system through line 421 and recycle acid being passed into line 414.

The reactor in FIG. 4 and the reaction step therein is cooled by a closed cycle refrigeration system. The conventional heating medium for this closed cycle refrigeration system is passed through line 422 into one side of header 404 divided by baffle 404a. The refrigerating medium then passes through the cooling coils 403 and out the other side of header 404 into line 423. From thence the heat exchanging medium is compressed at 424, condensed as at 425 and passed through line 426 to accumulator 427 from which, through line 428 and after pressure reduction at back pressure valve 429, the medium is again passed into the heat exchange elements of the reactor. Thus it is seen that this system differs completely from the systems of the preceding figures in that the hydrocarbon phase effluent from the acid settler 415 is not employed in any way as an effluent refrigeration medium for the reaction step. The entire hydrocarbon phase effluent has been passed from the top of the acid settling step at 415 to heat exchange with the olefin feed at 408 and from thence may be passed alternatively into either line 420, controlled by valve 421 or into line 422 controlled by valve 423 or split therebetween in any ratio desired.

That portion of the hydrocarbon phase effluent passed into line 420 joins common line 424 which passes into a neutralization step schematically diagrammed at 425. On the other hand, that portion passed into line 422 is passed via line 426 controlled by valve 427 or line 428 controlled by valve 429 to molecular sieve 430 or alternative sieve 431. Normal paraffinic hydrocarbons are passed from sieve 430 by line 432 controlled by valve 433, while they are passed from sieve 431 through line 434 controlled by valve 435, lines 432 and 434 joining in common withdrawal line 436. Isoparaffinic hydrocarbons and alkylate are returned from sieves 430 and 431 through lines 437 and 438 controlled by valves 439 and 440, respectively.

The sieve system in FIG. 4 is operated as the other sieve systems in that the feed from line 422 is passed first to one sieve until it is completely adsorbed, then the feed is shifted to the other sieve for desorption of the first, and vice versa. The normal paraffin eliminated hydrocarbons are passed into common line 424 to the neutralization step. From the neutralization step, through line 441, the neutralized more or less normal paraffin eliminated hydrocarbons are pressure reduced at back pressure valve 442 and passed into line 443. Back pressure valve 442 maintains sufficient back pressure on the entire system to maintain the hydrocarbons in liquid phase. Alternatively, the back pressure valve may be placed immediately after the acid separation step on line 419 before the heat exchange with the olefin feed at 408. Back pressure valve 442 is comparable to valves 91'', 64'' and 67'' in FIG. 6, valves 207 and 204 in FIG. 2 and valves 91, 64 and 67 in FIG. 1. The pressure reduced hydrocarbons are then passed alternatively into lines 444 and 445 controlled by valves 446 and 447, respectively. The preferred passage is the entire hydrocarbon phase effluent, more or less normal paraffin eliminated through line 444 into the alkylation flash vaporization drum indicated at 448. Drum 448 has header 449 comparable to header 404 into which heating medium such as steam is input through line 450, passes through heating coil or elements 451 in the lower portion of the vessel 448 and passes out through line 451 through the opposite side of the header after adding heat to the contents of the drum. Alternatively, a heater or heating step may be emplaced on line 444 before the vessel 448, which comprises basically a flash drum, in place of the in situ coil in the vessel 448. Volatile hydrocarbons, isobutane to a greater extent according to the normal paraffin removal in the sieve system, are removed overhead through line 452, condensed at 453 and accumulated at 454. Bottoms from the accumulator 454 are passed through line 455, pump 456 and into line 411 as recycle feed to the reactor. Liquid bottoms from the alkylation flash vaporization drum 448, comprising largely alkylate, are drawn off through line 457, joining any by-pass hydrocarbon phase effluent through line 445 and passed through common line 458 into isostripper 459.

It should be noted that, when the alkylation flash vaporization drum is not employed and all the hydrocarbon phase effluent is passed through line 445, the isostripper or fractionation step is only freed of the load of normal paraffin diluent removed through the sieve system. On the other hand, when at least some and up to all of the hydrocarbon phase effluent is first passed through the alkylation flash vaporization system at 448, the isostripper stage is also relieved of a great relative burden of light isoparaffin removal for recycle to the reaction step and thus the isostripper vessel may be greatly reduced in size even beyond that required when only the normal paraffin diluent is removed in the sieve system. If an allocation is made between the drum 448 and line 445, then a compromise in vessel 459 size may be made.

In the isostripper, reboiling takes place at 460 with alkylate bottoms withdrawn through line 461 and passed out of the system. Overhead from the isostripper is taken off through line 462, condensed at 463 and accumulated in drum 464. The bottoms from drum 464 are taken off through line 465 by pump 466 and passed from common line 467 either back into the isostripper through line 468 or as a recycle feed constituent in line 410.

In comparing the system of FIGS. 4 and 5 with those which have gone before, it should be noted that the use of the sieve system before any isobutane separation and recycle to the reaction step, either from the flash vaporization drum 448 or isostripper 459, is comparable strictly to the normal paraffin elimination from the effluent refrigeration hydrocarbon phase effluent streams from the acid settlers in the previous figures, as opposed to the stripping of the bottoms from the suction trap in the various preceding figures. Thus a complete scavenging of the normal paraffinic hydrocarbon diluent is possible before any recycle to the reaction step whereby to maximize the isobutane concentration there and minimize the normal paraffinic diluent. There is no benefit in the alkylation flash vaporization system from recycling any normal paraffinic diluent as it is not employed to cool the reaction step.

Further referring to the FIG. 4 and FIG. 5 systems, it should be noted that the type of reactor employed at 400 is not critical in that a cascade type reactor as shown in FIG. 1 of the application of Orlando Webb, Jr., Serial No. 748,833, filed July 16, 1958 "Alkylation Effluent Flash Vaporization System" could as well be employed with the hydrocarbon phase effluent from the cascade type reactor being normal paraffin eliminated before passing into the effluent flash drum system there illustrated.

Referring to FIG. 5, therein is shown a variation in the system of FIG. 4 where the neutralization step is inserted before the sieve system. All of the parts which are identical are numbered the same, but primed.

Once again, the sieves 430 and 431 are operated alternatively, that is, the feed is to one until it is fully adsorbed, and then the feed is switched to the other while the first is desorbed and vice versa.

The Adsorbent Sieve Systems

With respect to the separating step, wherein straight chain hydrocarbons are selectively adsorbed from admixture with nonstraight chain hydrocarbons, it is preferred in the practice of this invention to employ as the selected adsorbent, a solid, alumino-silicate molecular sieve type adsorbent, i.e., adsorbent which selectively adsorbs straight chain hydrocarbons to the substantial exclusion of nonstraight chain hydrocarbons.

Any suitable selective adsorption process effective for the removal of straight chain saturated hydrocarbons from branch chain hydrocarbons is satisfactorily employed in the practice of this invention.

The invention, however, is particularly applicable to a selective adsorbent comprising certain natural or synthetic zeolites or alumino-silicates, such as a calcium alumino-silicate which exhibits the properties of a molecular sieve, that is, matter made up of porous crystals wherein the pores of the crystals are of molecular dimension and are of substantially uniform size.

In general, zeolites may be described as water-containing alumino-silicates having a general formula R, $R_2'O \cdot Al_2O_3 \cdot nSiO_2 \cdot mH_2O$ wherein R may be an alkaline earth metal such as calcium, alkali metal such as sodium or potassium or lithium. These materials, when dehydrated for the removal of substantially all of the water therefrom, retain their crystalline structure and are particularly suitable as selected adsorbents.

A particularly suitable solid adsorbent for straight chain hydrocarbons is a calcium alumino-silicate, apparently actually a sodium calcium alumino-silicate, manufactured by Linde Air Products Company and designated Linde-type 5A molecular sieve. The crystals of this particular calcium alumino-silicate have a pore size or opening of about 5 angstrom units, a pore size sufficiently large to admit straight chain hydrocarbons, such as the normal paraffins, to the substantial exclusion of the nonstraight chain hydrocarbons, that is naphthenic, aromatic, isoparaffinic and isoolefinic hydrocarbons. This particular selective adsorbent is available in various sizees, such as in the form of 1/8 inch or 1/16 inch diameter pellets, or as a finely divided powder having a particle size in the range of 0.5–5.0 microns. In general, a selective adsorbent employed in the practice of this invention may be in any suitable form or shape, granular, spheroidal or microspheroidal.

Particularly suitable solid selective adsorbents which may be employed in the practice of this invention include the synthetic and natural zeolites which, when dehydrated, may be described as crystalline zeolites having a rigid three-dimensional anionic network and having interstitial dimensions sufficiently large to adsorb straight chain hydrocarbons but sufficienlty small to exclude the nonstraight chain hydrocarbons possessing larger molecular dimensions. The naturally occurring zeolite, chabazite, exhibits such desirable properties. Another suitable naturally occurring zeolite is analcite ($NaAlSi_2O_6 \cdot H_2O$) which, when dehydrated, and when all or part of the sodium is replaced by an alkaline earth metal such as calcium by base exchange use the material which may be represented by the formula $(Ca \cdot Na_2) Al_2Si_4O_{12} \cdot 2H_2O$ and which, after suitable conditioning, will absorb straight chain hydrocarbons to the substantial exclusion of nonstraight chain hydrocarbons. Other naturally occurring or synthetically prepared zeolites such as phacolite, gmelinite, harmotome and the like, or suitable base exchange modifications of these zeolites may also be employed in the practice of this invention.

Other solid inorganic or mineral selective adsorbents are known. It is contemplated that selective adsorbents having the property of selectively adsorbing straight chain hydrocarbons to the substantial exclusion of nonstraight chain hydrocarbons in the manner of a molecular sieve may be obtained by suitable treatment of various oxide gels, especially metal oxide gels of the polyvalent amphoteric metal oxides. Sieves are available in many pore sizes, but for my purpose, I prefer a sieve having pore openings of about 5 angstroms since this size will adsorb normal butane and reject isobutane.

The molecular sieves and the methods of making and using them in separation of normal and branched chain hydrocarbons per se are fully described in British Patent 777,232, also U.S. Patent 2,442,191, and the United States patents listed in the preamble to this application, which are incorporated herein by reference.

The separation of the normal paraffins from the isoparaffins may be accomplished by contacting the hydrocarbon feed mixture in either liquid or vapor phase with the absorption bed. In the event that vapor phase contact is preferred, the back pressure valves 442, 91, 64, 67, 207, 204, 91″, 64″ and 67″ are preferably inserted before the sieve systems on the lines whereby to have pressure reduction before the sieves and the vaporization of a maximum quantity of the hydrocarbon phase effluents. Temperature and pressures during adsorption in the vapor phase preferably may range from 100 to 150° F. and the pressure from 85 to 125 p.s.i.g. with lower temperatures and higher pressures favoring the adsorption of normal paraffins. Liquid phase adsorption may be carried out by simply slurrying the solid selective adsorbent with the liquid hydrocarbon mixture being treated, followed by separation or decantation of the resulting treated hydrocarbon effluent, now substantially free of or having a substantially reduced straight chain hydrocarbon content. Liquid phase adsorption may also be carried out by percolating the liquid hydrocarbon mixture to be treated through a bed of solid adsorbent material.

The molecular sieve beds may be desorbed by a number of methods which are well known to those skilled in the art. A preferred method of desorbing the beds is by reducing the pressure and raising the bed temperature in that this procedure precludes the introduction of extraneous material in the alkylation system. It is preferred in the practice of this invention to employ a straight chain hydrocarbon, such as ethane, propane or n-butane as the desorbing agent to effect desorption of the adsorbed straight chain hydrocarbons from the adsorbent. However, other desorbing agents, such as hydrogen, methane, branched chain hydrocarbons and the like or mixtures of desorbing agents, are also suitably employed. The normal paraffins obtained during the desorption steps are removed from the alkylation system and stored for future use.

It may be desirable in the practice of the invention to carry out the desorption of n-butane from the adsorbent by employing a straight chain hydrocarbon under conditions such that the desorption temperature is greater than the critical temperature of the straight chain hydrocarbon employed as the desorbing agent as well as the adsorbed straight chain hydrocarbon (n-butane) itself. I incorporate by reference the disclosure of U.S. Patent 2,818,455, issued December 31, 1957, as showing a desorption operation carried out above the critical temperature of the desorbing agent.

In the event that the adsorptive separation operation is desired to be carried out in a gaseous phase, that is, the hydrocarbon mixture undergoing treatment in the vapor phase during the adsorption treatment, any suitable method for effecting gas-solid contact may be employed, for example, a fixed bed, a moving bed or a fluidized bed or a gas-entrained mass of selective adsorbent. After sufficient time, the solid adsorbent is separated from the resulting treated hydrocarbon mixture, now having a reduced proportion of straight chain hydrocarbons, and the separated solid adsorbent is then subsequently treated to desorb the adsorbed straight chain hydrocarbons therefrom.

Desorption of the adsorbed hydrocarbons (straight chain) from the solid adsorbent material may be made at any suitable temperature and pressure. The operation may be carried out at a pressure in the range of zero to 10,000 p.s.i.g. If the desorption operation be carried out in a gaseous phase, the desorbing fluid and resulting desorbed hydrocarbons are both present in the desorption effluent in the gaseous or vaporous phase. The desorption temperature and pressure in such case are adjusted to maintain the desorption fluid and desorbed hydrocarbons in the gaseous phase. A desorption pressure in the range of 10 to 2000 p.s.i.g. may be suitable. Pressure differences may be present between the desorption operation and the adsorption operation. Any suitable desorption temperature sufficiently high to effect desorption of the adsorbed straight chain hydrocarbons may be employed. Usually a temperature in the range of 400 to 1100° F. is employed during the desorption operation. The desorption temperature should not be so high as to threaten the destruction of the adsorbent, usually limited to about 1100 to 1300° F. Temperature alone may be sufficient for desorption, but it generally is preferred to employ a hot gaseous or vaporized desorbing fluid. When a straight chain hydrocarbon such as ethane, propane, butane or the like is employed to effect desorption of the absorbed straight chain hydrocarbon, the desorption operation may be carried out at a temperature above the critical temperatures of not only the adsorbed straight chain hydrocarbons to be desorbed, but also above the critical temperature of the straight chain hydrocarbon employed as the desorbing fluid or agent. Thus using propane or normal butane to desorb adsorbed n-butane from the adsorbent material, the operation may be carried out at a temperature above the critical temperature of n-butane, i.e. above 307° F.

From the foregoing it will be seen that this invention is one well adapted to attain all of the ends and objects hereinabove set forth together with other advantages which are obvious and which are inherent to the process.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter hereinabove set forth or shown in the accompanying drawings is to be interpreted as illustrative and not in a limiting sense.

Having thus described my invention, I claim:

1. A process of alkylating isoparaffinic hydrocarbons with olefinic hydrocarbons in the presence of an acid catalyst comprising the steps of contacting isoparaffinic hydrocarbons and olefinic hydrocarbons in the presence of acid catalyst in a reaction step, withdrawing a mixture of hydrocarbons with acid catalyst as effluent from said reaction step, separating said effluent into an acid phase and a hydrocarbon phase in a first separating step, separating only normal paraffinic hydrocarbons from at least a portion of the hydrocarbon phase effluent in a second separating step while leaving isoparaffinic hydrocarbons therein, passing the normal paraffin separated hydrocarbon phase to a vapor withdrawal step, and removing both liquid and vapor phase material separately from said vapor withdrawal step.

2. A process as in claim 1 including passing liquids from the vapor withdrawal step to a fractionation step for separation of isoparaffinic hydrocarbons from said liquid.

3. A process as in claim 2 including recycling isoparaffinic hydrocarbons from said fractionation step as a feed constituent to the reaction step.

4. A process as in claim 1 including condensing vapors from said vapor withdrawal step and recycling them as feed to the reaction step.

5. A process as in claim 1 including passing liquid from the vapor withdrawal step to a fractionation step for separation of isoparaffinic hydrocarbons from said liquid and condensing vapors from said vapor withdrawal step and recycling them as feed to the reaction step.

6. A process as in claim 1 wherein the second separating step is carried out by passing the said portion of the hydrocarbon phase effluent to a molecular sieve system which separates normal paraffinic hydrocarbons from branched chain hydrocarbons.

7. A process as in claim 1 including the step of adding heat to said normal paraffin separated hydrocarbon phase effluent before passage from said vapor withdrawal step, and passing liquid from said vapor withdrawal step to a fractionation step for separation of isoparaffinic hydrocarbons from said liquid and condensing vapors from said vapor withdrawal step and recycling them as feed to the reaction step.

8. A process of alkylating isoparaffinic hydrocarbons with olefinic hydrocarbons in the presence of an acid catalyst comprising the steps of contacting isoparaffinic hydrocarbons and olefinic hydrocarbons in the presence of acid catalyst in a reaction step, withdrawing a mixture of hydrocarbons with acid catalyst as effluent from said reaction step, separating said effluent into an acid phase and a hydrocarbon phase in a first separating step, separating only normal paraffinic hydrocarbons from at least a portion of the hydrocarbon phase effluent in a second separating step while leaving isoparaffinic hydrocarbons therein, said reaction step and at least said first separating step maintained under sufficient pressure to maintain the hydrocarbon phase in liquid form, reducing the pressure on the normal paraffin eliminated hydrocarbon phase portion after one of said first and second separating steps, whereby to vaporize excess volatile hydrocarbons and cool said hydrocarbon phase effluent, passing the pressure reduced normal paraffin separated hydrocarbon phase portion to a vapor withdrawal step, and removing both liquid and vapor phase material separately from said vapor withdrawal step.

9. A process as in claim 8 including passing liquids from the vapor withdrawal system to a fractionation step for separation of isoparaffinic hydrocarbons from said liquid.

10. A process as in claim 9 including recycling said isoparaffinic hydrocarbons from said fractionation step to the reaction step as feed.

11. A process as in claim 8 including condensing vapors from said vapors withdrawal step and recycling them as feed to the reaction step.

12. A process as in claim 8 including passing liquid from the vapor withdrawal step to a fractionation step for separation of isoparaffinic hydrocarbons from said liquid and condensing vapors from said vapor withdrawal step and recycling them as feed to the reaction step.

13. A process as in claim 8 wherein said second separating step and normal paraffinic elimination from the hydrocarbon phase effluent is carried out in a molecular sieve arrangement operative to separate normal paraffinic hydrocarbons from branched chain hydrocarbons.

14. A process as in claim 8 including adding heat to said normal paraffin eliminated hydrocarbon phase before leaving said vapor withdrawal step, passing liquid from said vapor withdrawal step to a fractionation step for separation of isoparaffinic hydrocarbons from said liquid and condensing vapors from said withdrawal step and recycling them as feed to the reaction step.

15. A process as in claim 8 including passing the separated liquid hydrocarbons from said vapor withdrawal step in indirect heat exchanging relationship with the said reaction step.

16. A process as in claim 8 including passing all of said hydrocarbon phase effluent after said catalyst separating step to the second separating step.

17. A process as in claim 8 wherein all of said normal paraffinic separated hydrocarbon phase effluent is passed to said vapor withdrawal step.

18. A process as in claim 8 including passing all of said hydrocarbon phase effluent after catalyst separation to the second separating step and passing all of the normal paraffin separated hydrocarbon phase effluent from said second separating step to the said vapor withdrawal step.

19. A process of alkylating isoparaffinic hydrocarbons with olefinic hydrocarbons in the presence of an acid catalyst comprising the steps of contacting isoparaffinic hydrocarbons and olefinic hydrocarbons in the presence of acid catalyst in a reaction step, withdrawing a mixture of hydrocarbons with acid catalyst as effluent from said reaction step, separating said effluent into an acid phase and a hydrocarbon phase in a first separating step, passing at least a portion of the hydrocarbon phase effluent after catalyst separation to a second separating step and selectively removing only normal paraffinic hydrocarbons therefrom, while leaving isoparaffinic hydrocarbons therein, reducing the pressure on the normal paraffinic eliminated hydrocarbon phase portion after one of said first separating step and said second separating step to refrigerate it and vaporize excess volatile hydrocarbons, then passing at least a portion of said pressure reduced normal paraffinic hydrocarbon removed hydrocarbon phase effluent in indirect heat exchanging relationship with the reaction step, then separating the liquid portion of the reaction step heat exchanged hydrocarbon phase from the vapor portion thereof in a vapor withdrawal step and removing both liquid and vapor phase material separately from said vapor withdrawal step.

20. A process as in claim 19 wherein all of the hydrocarbon phase effluent, after catalyst separation, is passed to the second separating step for normal paraffinic hydrocarbon elimination therefrom.

21. A process as in claim 19 wherein all of the normal paraffinic separated hydrocarbon phase effluent is passed in indirect heat exchanging relationship with the reaction step.

22. A process as in claim 19 wherein all of the hydrocarbon phase effluent after catalyst separation is passed to the second separating step for normal paraffinic hydrocarbon elimination and all of the normal paraffinic separated hydrocarbon phase effluent is passed in indirect heat exchanging relationship with the reaction step.

23. A process as in claim 19 including the additional step of recycling liquid from the vapor withdrawal step in indirect heat exchanging relationship with the reaction step and return to said vapor withdrawal step.

24. A process as in claim 19 wherein said normal paraffinic hydrocarbon separation in said second separating step is carried out by a molecular sieve arrangement selectively removing normal paraffinic hydrocarbons from branched chain hydrocarbons.

25. A process as in claim 19 including passing liquid from said vapor withdrawal step to a fractionation step for separation of isoparaffinic hydrocarbons from said liquid.

26. A process as in claim 19 including condensing vapors from said vapor withdrawal step and recycling them as feed to the reaction step.

27. A process as in claim 19 including passing liquid from the vapor withdrawal step to a third separating step for additional separation of normal paraffinic hydrocarbons therefrom and then passing said normal paraffinic hydrocarbon separated liquid phase to a fractionation step for separation of isoparaffinic hydrocarbons therefrom.

28. A process as in claim 15 including passing liquid from the vapor withdrawal step to a third separating step and separating normal paraffinic hydrocarbons from the said liquid and then passing said normal paraffinic separated liquid to a fractionation step for separation of isoparaffinic hydrocarbons therefrom.

29. A process of alkylating isoparaffinic hydrocarbons with olefinic hydrocarbons in the presence of an acid catalyst comprising the steps of contacting isoparaffinic hydrocarbons and olefinic hydrocarbons in the presence of acid catalyst in a reaction step, withdrawing a mixture of hydrocarbons with acid catalyst as effluent from said reaction step, separating said effluent into an acid phase and a hydrocarbon phase in a first separating step, then separating only normal paraffinic hydrocarbons from at least a portion of the hydrocarbon phase effluent in a second separating step while leaving isoparaffinic hydrocarbons therein, and passing the said normal paraffinic hydrocarbon stripped hydrocarbon phase effluent portion to a fractionation step for separation of isoparaffinic hydrocarbons therefrom.

30. A process as in claim 29 including recycling isoparaffinic hydrocarbons from the fractionation step to the reaction step as a feed constituent.

31. A process as in claim 29 wherein the second separating step employs a molecular sieve arrangement for the segregation of normal paraffinic hydrocarbons from branched chain hydrocarbons.

32. A process of alkylating isoparaffinic hydrocarbons with olefinic hydrocarbons in the presence of an acid catalyst comprising the steps of contacting isoparaffinic hydrocarbons and olefinic hydrocarbons in presence of acid catalyst in the reaction step, withdrawing a mixture of hydrocarbons with acid catalyst as effluent from said reaction step, separating said effluent into an acid phase and a hydrocarbon phase in a first separating step, separating only normal paraffinic hydrocarbons from at least a portion of the hydrocarbon phase effluent in a second separating step while leaving isoparaffinic hydrocarbons therein, said reaction step and at least said first separating step maintained under sufficient back pressure to maintain the hydrocarbon phase in liquid form, reducing the pressure on the said normal paraffin eliminated hydrocarbon phase after one of said first and second separating steps and passing the normal paraffinic hydrocarbon stripped hydrocarbon phase effluent portion to a fractionation step for separation of isoparaffinic hydrocarbons therefrom.

33. A process of alkylating isoparaffinic hydrocarbons with olefinic hydrocarbons in the presence of an acid catalyst comprising the steps of contacting isoparaffinic hydrocarbons and olefinic hydrocarbons in the presence of acid catalyst in a reaction step, withdrawing a mixture of hydrocarbons with acid catalyst as effluent from said reaction step, separating said effluent into an acid phase and a hydrocarbon phase in a first separating step, passing at least a portion of the hydrocarbon phase to a vapor withdrawal step, removing both liquid and vapor phase material separately from said vapor withdrawal step and passing at least a portion of the vapor withdrawn from the vapor withdrawal step to a second separating step where normal paraffinic hydrocarbons are selectively removed from branched chain hydrocarbons.

34. A process as in claim 33 including passing said normal paraffin extracted hydrocarbon phase effluent to a fractionation step for separation of isoparaffinic hydrocarbons from said liquid.

35. A process as in claim 33 including condensing vapors from said vapor withdrawal step and recycling them as feed to the reaction step.

36. A process as in claim 33 wherein said second separating step employs a molecular sieve arrangement to selectively extract normal paraffinic hydrocarbons from branched chain hydrocarbons.

37. A process as in claim 33 wherein all of said liquid phase material from said vapor withdrawal step is passed to said second separating step.

References Cited in the file of this patent

UNITED STATES PATENTS

| | | |
|---|---|---|
| 2,412,143 | Gorin et al. | Dec. 3, 1946 |
| 2,429,205 | Jenny et al. | Oct. 21, 1947 |
| 2,664,452 | Putney | Dec. 29, 1953 |
| 2,818,459 | Gantt | Dec. 31, 1957 |
| 2,906,796 | Putney | Sept. 29, 1959 |

OTHER REFERENCES

Goldsby et al.: The Oil and Gas Journal, vol. 54, No. 20, pp. 104–107, Sept. 19, 1955.